(12) United States Patent
Kojima

(10) Patent No.: US 7,562,926 B2
(45) Date of Patent: Jul. 21, 2009

(54) WALK-IN-DEVICE

(75) Inventor: Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/574,512

(22) PCT Filed: Oct. 27, 2004

(86) PCT No.: PCT/JP2004/015947

§ 371 (c)(1),
(2), (4) Date: Mar. 1, 2007

(87) PCT Pub. No.: WO2006/030539

PCT Pub. Date: Mar. 23, 2006

(65) Prior Publication Data

US 2007/0278814 A1 Dec. 6, 2007

(30) Foreign Application Priority Data

Sep. 17, 2004 (JP) .......................... 2004-272270

(51) Int. Cl.
*B60N 2/02* (2006.01)
(52) U.S. Cl. .................. 296/65.13; 297/341; 296/65.09
(58) Field of Classification Search ............... 296/65.13
See application file for complete search history.

(56) References Cited

U.S. PATENT DOCUMENTS

| 2,826,241 | A | * | 3/1958 | Himka | ..................... 296/65.15 |
| 3,136,524 | A | * | 6/1964 | Pickles | ........................ 248/424 |
| 4,046,349 | A | * | 9/1977 | MacAfee | ..................... 248/424 |
| 4,143,911 | A | * | 3/1979 | Sakakibara et al. | ...... 296/65.14 |
| 4,634,180 | A | * | 1/1987 | Zaveri et al. | ................ 297/341 |
| 4,671,571 | A | * | 6/1987 | Gionet | ........................ 297/341 |
| 4,714,227 | A | * | 12/1987 | Holm et al. | ................. 248/595 |
| 4,767,156 | A | * | 8/1988 | Yamada et al. | .............. 297/313 |
| 4,822,101 | A | * | 4/1989 | Hosoe | ................... 297/378.12 |
| 4,844,542 | A | * | 7/1989 | Humer | ....................... 297/341 |
| 4,852,846 | A | * | 8/1989 | Weier | ......................... 248/430 |
| 5,221,071 | A | * | 6/1993 | Hill | ........................ 297/344.14 |

(Continued)

FOREIGN PATENT DOCUMENTS

JP 11-208325 8/1999

(Continued)

*Primary Examiner*—Kiran B. Patel
(74) *Attorney, Agent, or Firm*—Oblon, Spivak, McClelland, Maier & Neustadt, P.C.

(57) ABSTRACT

A walk-in device for a vehicle seat moved forward in conjunction with forward folding of a seatback. A lifting mechanism adjusts a surface height of a seat cushion, a reclining mechanism adjusts an inclination angle of a seatback that moves up and down together with the seat cushion, and a seat sliding mechanism remains at the same height regardless of the vertical position of the seat cushion and is used to adjust the longitudinal position of the vehicle seat. The vehicle seat is moved forward by the seat sliding mechanism in conjunction with the seatback being folded forward by the reclining mechanism, and a rigid member joining link connects a seatback coupling link, provided to the seatback and operating according to the forward-folding operation, and a slide lock releasing link, provided to the seat sliding mechanism and releasing the vehicle seat from being fixed in the longitudinal direction.

12 Claims, 11 Drawing Sheets

U.S. PATENT DOCUMENTS

| | | | | |
|---|---|---|---|---|
| 5,366,196 | A * | 11/1994 | Mitschelen et al. | 248/424 |
| 5,482,349 | A * | 1/1996 | Richter et al. | 296/65.09 |
| 5,820,216 | A * | 10/1998 | Feuillet | 297/341 |
| 5,863,098 | A * | 1/1999 | Kojima et al. | 297/344.15 |
| 5,882,061 | A * | 3/1999 | Guillouet | 296/65.05 |
| 5,899,532 | A * | 5/1999 | Paisley et al. | 297/341 |
| 6,152,533 | A * | 11/2000 | Smuk | 297/341 |
| 6,174,017 | B1 * | 1/2001 | Salani et al. | 296/65.03 |
| 6,193,297 | B1 * | 2/2001 | Vandermolen | 297/216.15 |
| 6,241,209 | B1 * | 6/2001 | von Mayenburg et al. | 248/421 |
| 6,371,431 | B1 * | 4/2002 | Schmidt et al. | 248/419 |
| 6,499,787 | B2 * | 12/2002 | Jach et al. | 296/65.09 |
| 6,540,295 | B1 * | 4/2003 | Saberan et al. | 297/344.21 |
| 6,648,392 | B2 * | 11/2003 | Fourrey et al. | 296/65.09 |
| 7,017,994 | B2 * | 3/2006 | Suck et al. | 297/341 |
| 7,201,426 | B2 * | 4/2007 | Villeminey | 296/65.09 |
| 7,278,686 | B2 * | 10/2007 | Yoshida | 297/338 |
| 7,318,573 | B2 * | 1/2008 | Yamada et al. | 248/424 |
| 7,328,930 | B2 * | 2/2008 | Aufrere et al. | 296/65.09 |
| 2004/0113477 | A1 * | 6/2004 | Kojima | 297/378.1 |
| 2005/0017532 | A1 * | 1/2005 | Oyama | 296/65.05 |
| 2006/0097538 | A1 * | 5/2006 | Villeminey | 296/65.09 |
| 2007/0120407 | A1 * | 5/2007 | Kojima | 297/344.11 |

FOREIGN PATENT DOCUMENTS

| | | |
|---|---|---|
| JP | 2003 190760 | 7/2000 |
| JP | 2003 40002 | 2/2003 |
| JP | 2003 291703 | 10/2003 |

* cited by examiner

WALK-IN-DEVICE

TECHNICAL FIELD

The present invention relates to a walk-in device for a vehicle seat. The device moves the vehicle seat forward in conjunction with a forward-folding operation for folding the seatback of the vehicle seat forward.

BACKGROUND ART

A seat device known as a walk-in vehicle seat is configured so that the entire seat moves forward in conjunction with an operation of folding the seatback of the vehicle seat forward (tilting the seat forward). This type of seat has been used in the past as a front seat for a two-door vehicle that does not have an entrance for rear seat passengers, but recently this seat has also come to be widely used in minivans and the like.

This type of walk-in seat has the following configuration and operation, as is disclosed in Patent Document 1, for example. The vehicle seat has a slide rail mechanism for supporting the entire vehicle seat in a manner that allows the seat to slide forwards and backwards. The slide rail mechanism has a lower rail fixed in place in the vehicle, an upper rail that slides with the vehicle seat, a locking plate for fixing the vehicle seat at an arbitrary sliding position, and a release lever for releasing the seat from being fixed by the locking plate. The seatback of the vehicle seat has a reclining plate that rotates as a result of an operation for reclining the seat forward past a specific angle. The release lever and the reclining plate are coupled using a rod. When the seatback is reclined forward past a specific angle, the movement of the rotating reclining plate is transmitted to the release lever through the rod, and the slide rail mechanism is released from being fixed. The vehicle seat is urged forward and the fixing is released, whereby the seat moves forward. Patent Document 2 discloses a coupling mechanism that uses a double-tube cable composed of a cable and an outer cable and based on the same principle as a rod.

Patent Document 1: Japanese Laid-open Patent Application No. 2000-190760 (see paras. 7-10, 23, FIGS. 3-5, 9)

Patent Document 2: Japanese Laid-open Patent Application No. 2003-291703 (see FIGS. 1-3, 6)

DISCLOSURE OF THE INVENTION

Problems that the Invention is Intended to Solve

Patent Document 1 discloses a walk-in device for a vehicle seat comprising a reclining mechanism for adjusting the angle of inclination of the seatback, and a seat sliding mechanism for adjusting the longitudinal position of the vehicle seat. In other words, this device does not include a lifting mechanism for adjusting the height of the cushion surface of the vehicle seat. In cases in which a lifting mechanism is included, the seatback is raised and lowered along with the seat cushion, and a reclining mechanism included in either the seatback or the seat cushion is also raised and lowered. The seat sliding mechanism is fixed at the same height regardless of the vertical position of the seat cushion, and is used to adjust the longitudinal position of the vehicle seat. Therefore, the position of the reclining plate provided to the seatback or seat cushion, and the position of the release lever provided to the seat sliding mechanism vary relative to each other depending on the raising and lowering of the vehicle seat with the lifting mechanism. The reclining plate and release lever therefore cannot be connected with a fixed component, such as the rod in Patent Document 1.

This problem can be resolved if the double-tube cable in Patent Document 2 is used, but the cable itself is complicated due to its double structure, and is also expensive. Also, a bracket for holding the outer cable must be provided to both the seatback and the seat sliding mechanism. Moreover, the layout of the seat structure has limitations, and the cost of these components is a factor. Furthermore, the cable must have sufficient extra length in order to correspond with the changes in the relative positions of the reclining plate and the release lever, and the ease of mounting the vehicle seat in the vehicle is compromised.

Additionally, nonuniformities in the length of the cable protruding from the outer cable cannot be ignored in terms of function, but in many cases, the cable is assembled with an adjustment system known as a double nut system This is also a factor in reduced productivity and economic efficiency.

The present invention was designed in view of these problems, and an object thereof is to provide a walk-in device for a vehicle seat that comprises a lifting mechanism for adjusting the height of the seat surface, wherein the vehicle seat is moved forward in conjunction with the forward folding of the seatback.

Means for Solving these Problems

The walk-in seat for a vehicle according to a first aspect of the present invention aimed at resolving the aforementioned problems comprises a lifting mechanism for adjusting the height of a surface of a vehicle seat cushion a reclining mechanism for adjusting the angle of inclination of a seatback of the vehicle seat, which moves up and down together with the seat cushion; and a seat sliding mechanism that remains at the same height regardless of the vertical position of the seat cushion and that is used to adjust the longitudinal position of the vehicle seat; wherein the vehicle seat is moved forward by the seat sliding mechanism in conjunction with the seatback being folded forward by the reclining mechanism; and wherein a joining link made of a rigid member connects a seatback coupling link, which is provided to the seatback and which operates according to the forward-folding operation, and a slide lock releasing link which is provided to the seat sliding mechanism and which releases the vehicle seat from being fixed in the longitudinal direction.

Since the rigid joining link connects the seatback coupling link with the slide lock releasing link, movement caused by the operation of the seatback coupling link can be reliably transmitted to the slide lock releasing link.

In cases in which a cable, such as a double-tube cable for example is used for this connection, the cable itself is expensive with a complicated structure, brackets or other such components are needed to hold the outer cable, and problems are encountered with productivity and economic efficiency, such as when the vehicle seat is mounted in the vehicle. However, since a joining link made of a rigid member is used for this connection in the present invention, such problems are not encountered.

In the walk-in seat for a vehicle according to a second aspect of the present invention, the joining link is rotatably fastened to the slide lock releasing link at a first fastening point at one end, and a second fastening point at the other end is rotatably fastened to a third fastening point of the seatback coupling link, whereby the slide lock releasing link and the seatback coupling link are connected; and in cases in which the second fastening point and the third fastening point are not mutually constrained, the trajectory of the second fastening point of the joining link that rotates about the first fastening point as a fulcrum in association with the up and down movement of the vehicle seat by the lifting mechanism, and the trajectory of the third fastening point of the seatback coupling link that moves together with the reclining mechanism in association with the up and down movement of the vehicle seat by the lifting mechanism, preferably coincide in at least two points between the lowest part and the highest part of the vehicle seat that is moved up and down by the lifting mechanism.

The seatback provided with the seatback coupling link moves up and down together with the seat cushion, which is moved up and down by the lifting mechanism. The seat sliding mechanism provided with the slide lock releasing link remains at the same height regardless of the vertical position of the seat cushion. Therefore, the fastening point of the joining link and the slide lock releasing link, which is located on the side of the seat sliding mechanism that is not moved up and down by the lifting mechanism, remains stationary and is unaffected by the operation of the lifting mechanism. The fastening point of the seatback coupling link and the joining link is a moving point that moves together with the seatback that moves up and down according to the operation of the lifting mechanism. In cases in which the seatback coupling link and the joining link are fastened by pins, bolts or the like, the fastening point (moving point) in the seatback coupling link and the fastening point (moving point) in the joining link exert force on each other while moving along the same trajectory according to the vertical movement of the seatback. However, in cases in which there is no linkage, no restraints are created by the mutual movement, and the links move along individual trajectories according to the vertical movement of the seatback. Specifically, the two links are not limited to moving along the same trajectory.

For example, since the fastening point of the slide lock releasing link and the joining link is stationary, the moving point of the joining link describes an arcuate trajectory about this fastening point as a fulcrum (center). However, the seatback coupling link does not necessarily move in an arcuate trajectory about this same point as a fulcrum (center). The vehicle seat is simultaneously inclined somewhat forward usually in cases in which the vehicle seat is raised and lowered by the lifting mechanism, and particularly in cases in which the orientation is changed vertically. This is to prevent the feet of a passenger of small stature from lifting too far off the floor when the seat surface is raised. Therefore, the vertical movement caused by the lifting mechanism is an oscillating movement rather than a linear movement, and the moving point of the seatback coupling link describes a trajectory corresponding to this oscillating movement. Therefore, it is believed that the fastening point in the seatback coupling link and the fastening point in the joining link have different trajectories in relation to the vertical movement caused by the lifting mechanism. If these trajectories are markedly different, the directions of force exerted by the two links on each other at these fastening points are markedly different, and a large load is imposed on the bolts or pins used for fastening, when the fastening point in the seatback coupling link and the fastening point in the joining link are fastened together. A large load is undesirable because such a load results in irregular sounds during operation, damage from continuous usage, and the like.

In view of this, if the two trajectories coincide with each other in at least two points between the lowest part and the highest part of the vehicle seat that is moved up and down by the lifting mechanism as in the present aspect, it is possible to prevent the two trajectories from taking markedly different paths. As a result, the problems described above can be prevented, and a satisfactory walk-in device can be obtained In the walk-in seat for a vehicle according to a third aspect of the present invention, it is preferable that the trajectory of the second fastening point and the trajectory of the third fastening point constitute the same trajectory between the lowest part and the highest part of the vehicle seat that is moved up and down by the lifting mechanism.

If the two trajectories constitute the same trajectory between the lowest part and the highest part of the vehicle seat that is moved up and down by the lifting mechanism, the directions of force exerted by the two links on each other are not markedly different in the fastening points when the fastening point in the seatback coupling link and the fastening point in the joining link are fastened together. Therefore, the load imposed on the bolts, pins, or other components for fastening is reduced. This has a desirable result in that it is possible to reduce irregular sounds during operation, damage from continuous usage, and the like.

In the walk-in seat for a vehicle according to a fourth aspect of the present invention, the joining link is configured from a plurality of link bodies that are rotatably fastened to each other; the link body located in the end portion on the side of the seatback coupling link and selected from the plurality of link bodies is rotatably fastened to the fastening point of the seatback coupling link; and one of the link fastening points between link bodies is located in the central position or a substantially central position of the trajectory described by the fastening point in association with the up and down movement of the vehicle seat by the lifting mechanism.

Since the rigid joining link connects the seatback coupling link with the slide lock releasing link, movement caused by the seatback coupling link can be reliably transmitted to the slide lock releasing link.

Since the rigid Joining link can be used for this connection, the structure is simplified, costs can be reduced, and the vehicle seat can be more easily mounted in the vehicle.

The seatback provided with the seatback coupling link moves up and down together with the seat cushion, which is moved up and down by the lifting mechanism. The seat sliding mechanism provided with the slide lock releasing link remains at the same height regardless of the vertical position of the seat cushion. Therefore, the fastening point of the joining link and the slide lock releasing link, which is located on the side of the seat sliding mechanism that is not moved up and down by the lifting mechanism, remains stationary and is unaffected by the operation of the lifting mechanism. The fastening point of the seatback coupling link and the joining link is a moving point that moves together with the seatback that moves up and down according to the operation of the lifting mechanism.

The vehicle seat is simultaneously inclined somewhat forward usually in cases in which the vehicle seat is raised and lowered by the lifting mechanism, and particularly in cases in which the orientation is changed vertically. This is to prevent the feet of a passenger of small stature from lifting too far off the floor when the seat surface is raised. Therefore, the vertical movement caused by the lifting mechanism is an oscillating movement rather than a linear movement, and the moving point of the seatback coupling link describes a trajectory corresponding to this oscillating movement.

In view of this, the joining link is configured from multiple link bodies that are rotatably fastened together, and one of the link fastening points is located in the central position of the trajectory described by the fastening point of the seatback coupling link, as in the present aspect of the present invention. When the vehicle seat is moved up and down by the lifting mechanism, only some of the link bodies, including the link body located in the end portion on the side of the seatback coupling link, will oscillate about the link fastening point. The oscillation of these particular links makes is possible to match the trajectory described by the fastening point of the joining link with the trajectory described by the fastening point of the seatback coupling link. These trajectories are described in association with the up and down movement of the vehicle seat by the lifting mechanism. Therefore, it is possible to reduce the load imposed on the bolts, pins, or other components for fastening the fastening point of the seatback coupling link and the fastening point of the joining link, and the vehicle seat can be moved more smoothly up and down by the lifting mechanism.

In the walk-in seat for a vehicle according to a fifth aspect of the present invention, it is preferable that the joining link be configured from a first link body and a second link body, and that the link joining part between the first link body and the second link body be rotatably fastened to the distal end of an oscillating arm.

Specifically, the first link body and the second link body are not merely rotatably fastened together, but rather the link joining part between the first link body and the second link body is rotatably fastened to the distal end of an oscillating arm, whereby the position of the link joining part can be maintained without movement by the oscillating arm. Therefore, the link joining part can be kept in the same position by the oscillating arm without any loose movement between the first link body and the second link body. Thus, the movement of the seatback coupling link caused by the forward-folding operation can be transmitted to the slide lock releasing link without any loose movement, and the walk-in device can be operated smoothly.

In the walk-in seat for a vehicle according to a sixth aspect of the present invention, it is preferable that the joining link be configured from a first link body and a second link body, and that the link joining part between the first link body and the second link body be slidably provided in an oval-shaped groove.

When the seatback coupling link is operated by the forward-folding operation, the movement of the link joining part can be smoothly guided according to the shape of the groove because the link joining part slides while being guided to move through the groove. Therefore, with merely a simple design alteration in the shape of the groove, the movement of the seatback coupling link caused by the forward-folding operation can be more easily transmitted to the slide lock releasing link. Thus, the walk-in device can be operated more smoothly with a simple design alteration.

Moreover, since the link joining part is slidably provided in the groove, the movement of the seatback coupling link caused by the forward-folding operation can be transmitted to the slide lock releasing link without any loose movement, similar to the case in which the link joining part is rotatably fastened to the distal end of the oscillating arm as described above. The walk-in device can be operated smoothly in this respect as well.

In the walk-in seat for a vehicle according to a seventh aspect of the present invention, the displacement of at least one link selected from the seatback coupling link and the slide lock releasing link is restrained so that a specific gap, which is provided in the adjustable range of the seatback in the normal seated position so that the reclining mechanism and the seatback coupling link are not connected, is maintained irrespective of the movement of the joining link brought about by changes in the height of the surface of the seat cushion.

As a rule, the fastening point in the seatback coupling link and the fastening point in the joining link have the same trajectory when the vehicle seat is moved up and down by the lifting mechanism, as described above. However, the trajectory of the fastening point in the seatback coupling link and the trajectory of the fastening point in the joining link sometimes become misaligned due to the restrictions on the spaces in which the link bodies are disposed. The two links then exert force on each other at the fastening points, and there is a possibility that the stronger of the two links will pull the other link. A specific gap is provided so that the reclining mechanism and the seatback coupling link are not connected within the adjustable range of the seatback angle in the normal seated position. This gap is necessary to smoothly adjust the angle of the seatback in the normal seated position, and to prevent the walk-in function from operating inadvertently. Therefore this gap must be maintained irrespective of the movement of the joining link brought about by changes in the height of the seat cushion surface. Therefore, if the displacement of at least one link selected from the seatback coupling link and the slide lock releasing link is restrained, the gap provided between the reclining mechanism and the seatback coupling link can be reliably maintained because the two links are fastened by a rigid joining link.

It is apparent that the configuration may be designed so that the seatback coupling link and the slide lock releasing link are both restrained, but it is sufficient for only one to be restrained because the joining link is a rigid member.

BEST MODE FOR CARRYING OUT THE INVENTION

First Embodiment

The first embodiment of the present invention will be described with reference to the diagrams FIGS. 1 and 2 are side views of a vehicle seat according to an embodiment of the present invention. This vehicle seat includes a lifting mechanism 3 for adjusting the height of the surface of the vehicle seat cushion 1, a reclining mechanism 4 for adjusting the angle of inclination of a seatback 2 of the vehicle seat that is raised and lowered together with the seat cushion 1, and a seat sliding mechanism 5 that has a fixed height regardless of the vertical position of the seat cushion 1, and that is used to adjust the longitudinal position of the vehicle seat.

FIG. 1 shows the vehicle seat as having been adjusted to the highest position by the lifting mechanism 3, and FIG. 2 shows the vehicle seat as having been adjusted to the lowest position The lifting mechanism 3 for adjusting the height of the surface of the seat cushion 1 is configured from two lift arms; e.g., a first lift arm 31 provided at the front of the vehicle seat, and a second lift arm 32 provided at the rear. These lift arms rotate at respective fulcra 3a and 4a, and thereby oscillate up and down in arcuate trajectories. The movement trajectories of the two lift arms are respectively the trajectories L1, L2 as shown in FIG. 1, and the trajectory L2 of the second lift arm 32 is the greater of the two. Therefore, when the seat cushion 1 is raised, the rear part of the seat cushion 1 is lifted higher and is inclined somewhat forward. This was designed with consideration for cases in which the seat cushion 1 is lifted or is altered in position in some other manner, and, assuming the passenger is small in stature, the seat surface is merely raised. This design is intended to prevent the feet of a passenger of small stature from lifting off the floor of the vehicle.

The seatback 2 moves along with the raising and lowering of the seat cushion 1 by the lifting mechanism 3, as is made clear in FIGS. 1 and 2. Therefore, the reclining mechanism 4, which is provided in either the seatback 2 or the seat cushion 1 and which adjusts the angle of inclination of the seatback 2, also moves along with the raising and lowering of the seat cushion 1 by the lifting mechanism 3.

The reclining mechanism 4 is provided with a reclining handle 41 for manually adjusting the angle of inclination and for folding the seat forward, and a foot lever 42 for folding the seatback 2 forward when depressed from behind the vehicle seat (in the rear passenger seat, for example).

The seat sliding mechanism has a fixed height regardless of the vertical position of the seat cushion 1, and is used to adjust the longitudinal position of the vehicle seat. The seat sliding mechanism 5 has a pair of left and right lower rails 51, and these lower rails 51 are positioned parallel to each other at the bottom of the vehicle seat and are mounted on the floor of the vehicle by means of brackets 10. The lower rails 51 extend in the longitudinal direction of the vehicle. The lower rails 51 are formed into a U shape in cross section so that the bottom part faces the floor surface. Engaging flange walls are formed continuously from the top ends of the two sides of this U shape, and the flanges are curved inward to face each other across a specific gap (see FIG. 5).

Upper rails 52 are fixed to the seat cushion 1, and the upper rails extend in the longitudinal direction of the vehicle. The upper rails have a substantial inversed T shape in cross section that has a horizontal part and perpendicular walls and engaging flange walls that curve upward are formed continuously from the two ends of the horizontal part. The engaging flange walls of the upper rails 52 engage with the engaging flange walls of the lower rails 51 via balls and rollers. The upper rails 52 are thereby supported by the lower rails 51 and are free to slide in the longitudinal direction thereof (the longitudinal direction of the vehicle) (see FIG. 5).

Springs (not shown) are placed between the longitudinal front ends of the lower rails 51 and the longitudinal back ends of the upper rails 52, and the upper rails 52 bear the urging force of these springs and are constantly slidably urged towards the front of the vehicle in relation to the lower rails 51. Therefore, the vehicle seat (seat cushion 1), whose longitudinal position is fixed with the upper rails 52 is constantly urged towards the front of the vehicle.

The passenger can adjust the longitudinal position of the vehicle seat by releasing the seat fixing mechanism that fixes the lower rails 51 and the upper rails 52. The seat fixing mechanism can be released and the longitudinal position of the vehicle seat can be adjusted by operating a seat sliding handle 55. A slide lock releasing link 6 is provided for releasing the seat fixing mechanism in conjunction with the forward folding of the seatback 2, without using the seat sliding handle 55. The slide lock releasing link 6 and a seatback coupling link 7 operated according to the seatback 2 being folded forward by the reclining mechanism 4 are connected by a long fixed joining link 8 formed from a rigid member A walk-in device for a vehicle seat is thereby configured, wherein the seat fixing mechanism is released and the vehicle seat is moved forward by the seat sliding mechanism 5 urged by the springs, in conjunction with the seatback 2 being folded forward by the reclining mechanism 4.

The following is a description of the functions of the slide lock releasing link 6, a memory plate 54, and a memory link 9 engaged therewith which are shown in FIGS. 1 and 2.

FIG. 3 is an enlarged view of the walk-in device in FIG. 1. The slide lock releasing link 6 and the seatback coupling link 7 are connected as a result of a fastening point 6b of the slide lock releasing link 6 being rotatably fastened at a first fastening point 8a at one end of the joining link 8, and as a result of a second fastening point 8b at the other end of the joining link 8 being rotatably fastened to a fastening point (third fastening point) 7b of the seatback coupling link 7.

The reclining mechanism 4 is provided with a bracket 43 that moves according to the angle of inclination of the seatback 2. The bracket forms a gap G (space) at a specific distance from the seatback coupling link 7, within the adjustable range of the seatback in the normal seated position. This gap G is provided to ensure that the bracket 43 and the seatback coupling link 7 do not come in contact for the below-described reasons in cases in which the walk-in function is not operated, even taking into account factors such as errors in assembling these components in the vehicle. The link mechanism of the walk-in device is provided with a restraining mechanism (stopper) in order to ensure that this gap G is formed.

In the present embodiment, the restraining mechanism (stopper) is configured jointly by the slide lock releasing link 6 and the memory link 9. The slide lock releasing link 6 is arranged so as to rotate with a fulcrum 6a as a rotational axis A protuberance 6c is formed on the slide lock releasing link 6 as shown in FIG. 3, and this protuberance 6c is designed to be in contact with an inclined part 9c of the memory link 9. The slide lock releasing link 6 must rotate clockwise about the fulcrum 6a in order to move in a direction that reduces the size of the gap G. However, the slide lock releasing link 6 is constrained from rotating because the protuberance 6c is in contact with the inclined part 9c of the memory link 9 and because a leg part 9b of the memory link 9 placed so as to rotate about a fulcrum 9a comes into contact with the memory plate 54 and is prevented from rotating counterclockwise.

A stopper 44 may also be provided to a position in the cushion frame 1a that restrains the movement of the seatback coupling link 7 in order to maintain the gap G, as shown by the single-dashed line in FIG. 3. The seatback coupling link 7 is provided so as to rotate about a fulcrum 7a as a rotational axis, and is normally urged in the clockwise direction. This movement may be restrained by the stopper 44 to prevent contact with the bracket 43. Since the slide lock releasing link 6 and the seatback coupling link 7 are connected by the long fixed joining link 8 made from a rigid member, at least one link selected from the slide lock releasing link 6 or seatback coupling link 7 can be restrained from being displaced.

The following is a description, made with reference to FIGS. 1, 2, and 4, of the operation of the walk-in device for a vehicle seat according to the embodiment of the present invention. The reclining mechanism 4 operates to fold the seatback 2 forward in the direction of the arrow A as a result of the operation of the reclining handle 41 or the foot lever 42. The bracket 43, which moves together with the reclining mechanism 4a moves past the gap G and comes into contact with the seatback coupling link 7. The seatback coupling link 7 couples with the seatback 2 and rotates counterclockwise in the diagram; i.e., in the direction of the arrow B, about the fulcrum 7a as an axis. The fastening point 7b of the seatback coupling link 7 moves toward the rear of the vehicle seat; i.e., in the direction of the arrow C in the diagram, and the joining link 8 fastened to the seatback coupling link 7 at the second fastening point 8b also moves in the direction of the arrow C. The joining link 8 causes the slide lock releasing link 6 to rotate about the fulcrum 6a as a rotational axis via the fastening point 6b of the slide lock releasing link 6 fastened at the first fastening point 8a. The slide lock releasing link 6 is rotated in the counterclockwise direction (the direction of the arrow D). A pin 61 moves downward along with this rotation, and the seat fixing mechanism that fixes the lower rails 51 and the upper rails 52 is released (the details of this release are described later with reference to FIG. 5). The vehicle seat urged by the springs (not shown) moves forward (in the direction of the arrow E in the diagram) when the seat fixing mechanism is released. The memory link 9 moves forward past the memory plate 54 when the vehicle seat moves forward a specific distance. At this point, the leg part 9b of the memory link 9 and the memory plate 54 come out of contact, and the memory link 9 urged counterclockwise rotates about the fulcrum 9a as a rotational axis. As a result, an engaging step 6d of the slide lock releasing link 6 is engaged with an arm part 9d of the memory link 9, the slide lock releasing link 6 urged clockwise is restrained from rotating, and the seat fixing mechanism for fixing the lower rails 51 and the upper rails 52 is kept in the released state.

The releasing of the seat fixing mechanism, which was omitted from the above description, will row be described with reference to FIG. 5. FIG. 5 shows a cross section in the width direction of the vehicle seat, and this cross section passes through the pin 61 of the slide lock releasing link 6 FIG. 5(a) shows the rails as being fixed by the seat fixing mechanism, and FIG. 5(b) shows the rails as being released. The lower rails 51 which have a U shape in cross section, and the upper rails 52 which have an inverted T shape in cross section, as shown in the diagram, are engaged via flange walls as well as balls and rollers (not shown. A locking plate 57 constituting the seat fixing mechanism is free to rotate about a fulcrum 57a as a rotational axis, and is urged clockwise in the diagram so that an engaging tooth 57b engages with an engaging hole 51a in a lower rail 51 and an insertion hole 52a in an upper rail 52. Multiple engaging holes 51a and insertion holes 52a are formed in the longitudinal direction longitudinal direction of the vehicle seat) at specific common intervals. The passenger operates the seat sliding handle 55 when manually sliding the vehicle seat in the longitudinal direction, whereupon the handle is displaced downward, a contact part 55a comes into contact with a contact surface 57c of the locking plate 57, the locking plate 57 is rotated counterclockwise, and the lock is thereby released. In cases in which a walk-in mechanism is used, this operation causes the slide lock releasing link 6 to rotate, and then the pin 61, which is displaced downward by this rotation, pushes the contact part 55a downward. Furthermore, the contact part 55a and the contact surface 57c of the locking plate 57 come into contact, and the locking plate 57 is rotated counterclockwise, whereby the lock is released.

As described above, a suitable walk-in device is realized by the connection and cooperation between the seatback coupling link 7, the slide lock releasing link 6, and the long fixed joining link 8 formed from a rigid member. However, the vehicle seat of the present embodiment has a lifting mechanism and therefore has a more preferable configuration. This configuration is described below with reference to FIG. 6.

The seatback 2 including the seatback coupling link 7 constitutes an integrated vehicle seat, and therefore moves up and down along with the seat cushion 1 which is moved up and down by the lifting mechanism 3. The seat sliding mechanism 5 including the slide lock releasing link 6 is fixed in place on the floor of the vehicle by the brackets 1, and therefore remains at the same height regardless of the vertical position of the seat cushion 1. Therefore, the fastening point (fastening point 6b, first fastening point 8a) of the slide lock releasing link 6 and joining link 8, which is located on the side of the seat sliding mechanism 5 that is not moved up and down by the operation of the lifting mechanism 3, remains in place regardless of the operation of the lifting mechanism 3.

The fastening point (third fastening point 7b, second fastening point 8b) of the seatback coupling link 7 and the joining link 8 is a moving point that moves together with the seatback 2, which moves up and down according to the operation of the lifting mechanism 3. In cases in which the seatback coupling link 7 and the joining link 8 are fastened by pins, bolts, or the like, the fastening point (third fastening point 7b) of the seatback coupling link 7 and the fastening point (second fastening point 8b) of the joining link 8 move along the same trajectory according to the vertical movement of the seatback 2 while being affected by each other. However, in cases in which the links are not fastened by pins, bolts, or the like, the links do not affect each other and are not limited to moving along the same trajectory according to the vertical movement of the seatback 2.

For example, since the fastening point (fastening point 6b, first fastening point 8a) of the slide lock releasing link 6 and joining link 8 is stationary, this point serves as a fulcrum (center) when the moving point (second fastening point 8b) of the joining link 8 describes an arcuate trajectory L8 as shown in FIG. 6. In this arrangement, the radius R is the distance between the first fastening point 8a and the second fastening point 8b of the joining link 8. However, in cases in which the moving point (third fastening point 7b) of the seatback coupling link 7 is not fastened to the joining link 8, the arcuate trajectory does not necessarily have this same point as a fulcrum (center). As previously described, the vehicle seat is simultaneously inclined somewhat forward usually in cases in which the vehicle seat is raised and lowered by the lifting mechanism 3, and particularly in cases in which the orientation is changed vertically. Therefore, the vertical movement caused by the lifting mechanism is an oscillating movement rather than a linear movement, and the third fastening point 7b, which is the moving point of the seatback coupling link 7, describes a trajectory L7 corresponding to this oscillating movement. FIG. 6 shows an example with an arc of the radius R1 from an imaginary center point O.

Thus, it is supposed that the fastening point (third fastening point) 7b of the seatback coupling link 7 and the fastening point (second fastening point) 8b of the joining link 8 describe different trajectories along with the vertical movement caused by the lifting mechanism 3. If there is a large difference between the trajectories, a large load is imposed on the pins, bolts, or the like at the fastening point (third fastening point) 7b of the seatback coupling link 7 and the fastening point (second fastening point) 8b of the joining link 8 when these fastening points are fastened together. A large load is undesirable because such a load results in irregular sounds during operation, damage from continuous usage, and the like. In view of this, in the present embodiment, the two trajectories L7 and L8 coincide with each other in at least two intersecting points X1 and X2 between the lowest part LL and the highest part UL of the vehicle seat that is moved up and down by the lifting mechanism 3. It is thereby possible to prevent the trajectories L7 and L8 from taking markedly different paths, and a favorable walk-in device can be obtained.

When the two trajectories are both arcuate, one may have a greater curvature than the other. FIG. 6 shows an example of a case in which the curvature of the trajectory L7 of the fastening point (third fastening point) 7b of the seatback coupling link 7 is greater than the curvature of the trajectory L8 of the fastening point (second fastening point) 8b of the joining link 8. Therefore, the trajectory L7 of the third fastening point 7b is located inside of the trajectory L8 of the second fastening point 8b at the lowest part LL of the vehicle seat, the trajectory L7 moves outside of the trajectory L8 past the intersection point X1, and the trajectory L7 returns to the inside of the trajectory L8 past the intersecting point X2, at which point the trajectories reach the highest part UL of the vehicle seat. Although not illustrated, in a case in which the relationship between the size of the curvatures is reversed, the trajectory L7 of the third fastening point 7b is located outside of the trajectory L8 of the second fastening point 8b at the lowest part LL of the vehicle seat, the trajectory L7 moves inside of the trajectory L8 past the intersection point X1, and the trajectory L7 returns to the outside of the trajectory L8 past the intersecting point X2, at which point the trajectories reach the highest part UL of the vehicle seat.

It is not necessary that the trajectories have their centers in the same direction as in the example described above, and the centers may be on the mutually opposite sides of the trajectories. In this case as well, though not illustrated, the trajectory L7 of the third fastening point 7b is located outside of the trajectory L8 of the second fastening point 8b at the lowest part LL of the vehicle seat, the trajectory L7 moves inside of the trajectory L8 past the intersection point X1, and the trajectory L7 returns to the outside of the trajectory L8 past the intersecting point X2, at which point the trajectories reach the highest part UL of the vehicle seat. It is apparent that the trajectory L7 may also be a trajectory that is not arcuate.

The trajectory L8 of the second fastening point 8b of the joining link 8, which rotates about the first fastening point 8a as a fulcrum along with the vertical movement of the vehicle seat by the lifting mechanism 3, and the trajectory L7 of the third fastening point 7b of the seatback coupling link 7 may coincide in at least two points (the intersecting points X1, X2 in FIG. 6) between the lowest part LL and the highest part UL of the vehicle seat that is moved up and down by the lifting mechanism 3. It is apparent that the trajectories may also constitute the same trajectories between the lowest part LL and the highest part UL. Specifically, this option is extremely preferable because the trajectories coincide at all points between the lowest part LL and the highest part UL.

FIG. 3 was used to describe a restraining mechanism in which the cooperation of the slide lock releasing link 6 and the memory link 9, or the placement of a stopper 44, is used to maintain the gap G provided to ensure that the bracket 43 and the seatback coupling link 7 do not come into contact. At this time, there is a possibility that the bracket 43 and the seatback coupling link 7 will come into contact due to reclining during normal position changes. However, although the trajectory L8 of the second fastening point 8b and the trajectory L7 of the third fastening point 7b are different, the trajectories affect each other when the second fastening point 8b and the third fastening point 7b are fastened, as described above. Therefore, the seatback coupling link 7 is subjected to clockwise rotational force from the force applied from the joining link 8, for example, and it is acceptable for the seatback coupling link 7 to come into contact with the bracket 43. The restraining mechanism also serves to prevent such unnecessary transmission of force.

The present invention provides a walk-in device for a vehicle seat provided with a lifting mechanism for adjusting the height of the seat surface as described above, wherein the vehicle seat is moved forward in conjunction with the forward folding of the seatback.

Second Embodiment

The second embodiment of the present invention will now be described with reference to FIGS. 7 through 9. In the first embodiment, an example was described in which the joining link 8 was configured from a single link body, but in the second embodiment, the joining link 8 is configured from multiple link bodies that are rotatably fastened to each other. The joining links are described below but the rest of the configuration is not described.

Of these multiple link bodies the link body located in the end portion on the side of the seatback coupling link 7 is rotatably fastened to the fastening point of the seatback coupling link 7; i.e., the third fastening point 7b. One of the link fastening points between link bodies is disposed in the central position of the trajectory described by the third fastening point 7b in association with the up and down movement of the vehicle seat by the lifting mechanism 3.

FIGS. 8 and 9 are enlarged views of the walk-in device in FIG. 7. FIG. 7 shows a state in which the vehicle seat has been adjusted to the lowest end position by the lifting mechanism 3.

The joining link 8 is configured from a first link body 12 and a second link body 13, which are rotatably fastened to each other. The first link body 12 is rotatably fastened to the fastening point 6b of the slide lock releasing link 6 at a first link fastening point 12a, which is at one end of the first link body 12. The second link body 13 is rotatably fastened to the third fastening point 7b of the seatback coupling link 7 at a second link fastening point 13a, which is at the end of the second link body 13. A link connecting part 14 of the first link body 12 and the second link body 13 is rotatably fastened to the distal end of an oscillating arm 15, which is supported to oscillate about an oscillation center 11a of a base 11.

The manner in which the joining link 8 is operated by the lifting mechanism 3 will now be described with reference to FIGS. 7 and 8.

Since the seatback 2 provided with the seatback coupling link 7 constitutes an integrated vehicle seat, the seatback 2 moves up and down together with the seat cushion 1, which is moved up and down by the lifting mechanism 3. The seat sliding mechanism 5 provided with the slide lock releasing link 6 is fixed in place on the floor of the vehicle by the brackets 10, and therefore remains at the same height regardless of the vertical position of the seat cushion 1.

The fastening point (fastening point 6b, first link fastening point 12a) of the slide lock releasing link 6 and the first link body 12, which is located on the side of the seat sliding mechanism 5 that is not moved up and down by the lifting mechanism 3, remains in place regardless of the operation of the lifting mechanism 3. The fastening point (third fastening point 7b, second link fastening point 13a) of the seatback coupling link 7 and second link body 13 is a moving point that moves together with the seatback 2, which moves up and down according to the operation of the lifting mechanism 3.

In view of this, as shown in FIG. 8, the link fastening point P in the center of the link connecting part 14 between the first link body 12 and second link body 13 is disposed in the central position (or a substantially central position) of the trajectory L9 described by the third fastening point 7b in association with the up and down movement of the vehicle seat by the lifting mechanism 3.

When the seatback 2 is moved up and down by the lifting mechanism 3, the third fastening point 7b describes an arcuate trajectory L9 which has a radius R2 and whose center is the link fastening point P. Only the second link body 13 in the joining link 8 oscillates about the link fastening point P as a fulcrum in association with the up and down movement of the vehicle seat by the lifting mechanism 3. Therefore, the trajectory of the third fastening point 7b and the trajectory of the second link fastening point 13a in the second link body 13 can be aligned along the same trajectory L9 in relation to the vertical movement of the seatback 2 caused by the lifting mechanism 3.

In FIG. 8, the solid lines indicate the positions of the seatback coupling link 7 and second link body 13 when the vehicle seat moved up and down by the lifting mechanism 3 is at the lowest position, and the single dashed lines indicate the positions of the same components when the vehicle seat is at the highest position.

Thus, it is possible to reduce the load imposed on the bolts, pins, or other components used to fasten the third fastening point 7b of the seatback coupling link 7 and the second link fastening point 13a of the second link body 13, and the vehicle seat can be moved up and down more smoothly by the lifting mechanism 3. Moreover, the link connecting part 14 is rotatably fastened to the distal end of the oscillating arm 15. Therefore, the position of the link connecting part 14 can be maintained so that there is no loose movement of the oscillating arm 15 between the first link body 12 and the second link body 13. Maintaining the position in this manner makes it possible for the movement of the seatback coupling link 7 brought about by the forward-folding operation to be transmitted to the slide lock releasing link 6 without any loose movement, and also makes it possible for the walk-in device to operate smoothly.

In FIGS. 8 and 9, forming the second link body 13 into a curved shape allows the second link body 13 to avoid other members and components (not shown) located between the link fastening point P and the third fastening point 7b. This can be achieved by a simple alteration in design in which the shape of the link body is altered so that the link fastening point P remains in the central position of the trajectory L9 of the third fastening point 7b even when there is a change in the relative positions of the third fastening point 7b and the link fastening point P.

In the second embodiment, one of the link fastening points between link bodies may be disposed in the central position (or a substantially central position) of the trajectory described by the third fastening point 7b in conjunction with the up and down movement of the seatback 2 by the lifting mechanism 3, and this arrangement can be suitably altered in the case of multiple link bodies, such as three or more.

In the present embodiment, the reclining mechanism 4, the slide lock releasing link 6, and other components are similar to those of the previous embodiment, and descriptions thereof are omitted.

The restraining mechanism is not limited to the combined action of the slide lock releasing link 6 and the memory link 9.

For example, a stopper 44 may be provided to a position that restrains the movement of the seatback coupling link 7 in the cushion frame 1a, as shown by the single dashed line in FIGS. 8 and 9. The seatback coupling link 7 is arranged so as to rotate about the fulcrum 7a as a rotational axis, and is normally urged in the clockwise direction. This link may be restrained by the stopper 44 to prevent contact with the bracket 43.

A stopper 45 may be provided to a position that restrains the counterclockwise movement of the oscillating arm 15, as shown by the dotted lines in FIGS. 8 and 9. The slide lock releasing link 6 is free to rotate about the fulcrum 6a as a rotational axis and is normally urged in the clockwise direction, and the oscillating arm 15 is therefore normally urged in the counterclockwise direction. Therefore, the oscillating arm 15 is restrained from moving in the counterclockwise direction by the stopper 45 as shown in FIGS. 8 and 9, whereby the movement of the link connecting part 14 is restrained, the gap G is maintained, and contact with the bracket 43 can be prevented.

The following is a description, made with reference to FIG. 9, of the operation of the walk-in device for a vehicle seat according to the embodiments of the present invention. The reclining mechanism 4 is operated by the operation of the reclining handle 41 and the foot lever 42, and the seatback 2 is folded forward in the direction of the arrow A. The bracket 43, which moves together with the reclining mechanism 4, moves past the gap G and comes into contact with the seatback coupling link 7. The seatback coupling link 7 rotates counterclockwise about the fulcrum 7a as an axis, i.e., in the direction of the arrow B, in conjunction with the seatback 2 that folds forward.

The third fastening point 7b of the seatback coupling link 7 moves toward the rear of the vehicle seat, i.e., in the direction of the arrow C in the diagram. The second link body 13 fastened to the seatback coupling link 7 accordingly moves in the direction of the arrow C, and the first link body 12 moves in the direction of the arrow C while the oscillating arm 15 oscillates in the direction of the arrow C. The slide lock releasing link 6 fastened to the first link body 12 rotates along with this movement in the counterclockwise direction (the direction of the arrow D) in the diagram about the fulcrum 6a as a rotational axis. The pin 61 then moves downward, and the seat fixing mechanism that fixes the lower rails 51 and the upper rails 52 is released. The details of this release are the same as those described in FIG. 5, and a description herein is therefore omitted.

When the seat fixing mechanism is released, the vehicle seat, being urged by the springs (not shown), moves forward (in the direction of the arrow E in the diagram). When the vehicle seat moves forward a specific distance, the memory link 9 moves forward past the memory plate 54. At this point, the leg part 9b of the memory link 9 and the memory plate 54 come out of contact, and the memory link 9, being urged counterclockwise, rotates about the fulcrum 9a as a rotational axis. As a result, an engaging step 6d of the slide lock releasing link 6 is engaged with an arm part 9d of the memory link 9, the slide lock releasing link 6 urged clockwise is restrained from rotating, and the seat fixing mechanism for fixing the lower rails 51 and the upper rails 52 continues to be released.

In the second embodiment, an example was described in which the joining link 8 was configured from two link bodies, e.g., the first link body 12 and the second link body 13, as shown in FIGS. 7 and 8, but the number of link bodies can be suitably varied to three or more.

Third Embodiment

The third embodiment of the present invention will now be described. The third embodiment is similar to the second embodiment in that the joining link 8 is configured from multiple link bodies that are rotatably fastened to each other, as shown in FIGS. 10 and 11. The second embodiment was described with reference to an example wherein the link connecting part 14 was oscillatably fastened to the distal end of the oscillating arm 15, but in the third embodiment, the link connecting part 14 between the first link body 12 and the second link body 13 is slidably provided in an oval-shaped groove 17 formed in a guiding body 16.

During the operation of the walk-in device in the third embodiment, when the seatback coupling link 7 rotates in the direction of the arrow 3 about the fulcrum 7a as an axis, the fastening point 7b of the seatback coupling link 7 moves toward the rear of the vehicle seat, i.e., in the direction of the arrow C, as shown in FIG. 11, which is an enlarged view of the walk-in device. The link connecting part 14 of the second link body 13 is accordingly guided in the direction of the arrow C along the groove 17, and the first link body 12 moves in the direction of the arrow C.

The movement of the link connecting part 14 can be guided smoothly, depending on the shape of the groove 17. For example, the shape of the groove 17 can be designed so that the movement of the link connecting part 14 by the seatback coupling link 7 can be guided smoothly in the groove 17 at the height of the surface of the generally used seat cushion 1. Therefore, the walk-in device can be operated smoothly by simple alterations in the design, such as altering the shape of the groove 17.

Also, since the link connecting part 14 is slidably provided in the groove 17, it is possible for the movement of the seatback coupling link brought about by the forward-folding operation to be transmitted to the slide lock releasing link 6 without any loose movement, and also for the walk-in device to be operated smoothly, similar to the second embodiment.

In the third embodiment, the restraining mechanism is configured jointly from the slide lock releasing link 6 and the memory link 9, similar to the second embodiment. However, instead of the restraining mechanism composed of the slide lock releasing link 6 and the memory link 9, another possibility is for the end of the groove 17 to be configured as a contact part 17*a* for restraining the link connecting part 14 from moving toward the front of the vehicle i.e., in the opposite direction of the arrow C, as shown in FIGS. 10 and 11.

The slide lock releasing link 6 is free to rotate about the fulcrum 6*a* as a rotational axis, and is normally urged in the counterclockwise direction. Therefore, the link connecting part 14 is normally urged toward the front of the vehicle, i.e., in the opposite direction of the arrow C, and is restricted from moving toward the front of the vehicle, i.e., in the opposite direction of the arrow C by the contact part 17*a*, whereby the gap G is maintained, and contact with the bracket 43 can be prevented.

The third embodiment was described with reference to an example in which the joining link 8 was configured from two link bodies, e.g., the first link body 12 and the second link body 13, as shown in FIGS. 10 and 11, but the number of link bodies can be suitably varied to three or more.

INDUSTRIAL APPLICABILITY

The present invention can be applied to walk-in devices for vehicle seats in two-door vehicles or minivans, which have fewer passenger entrances than passenger seats.

Key

Figure 1:
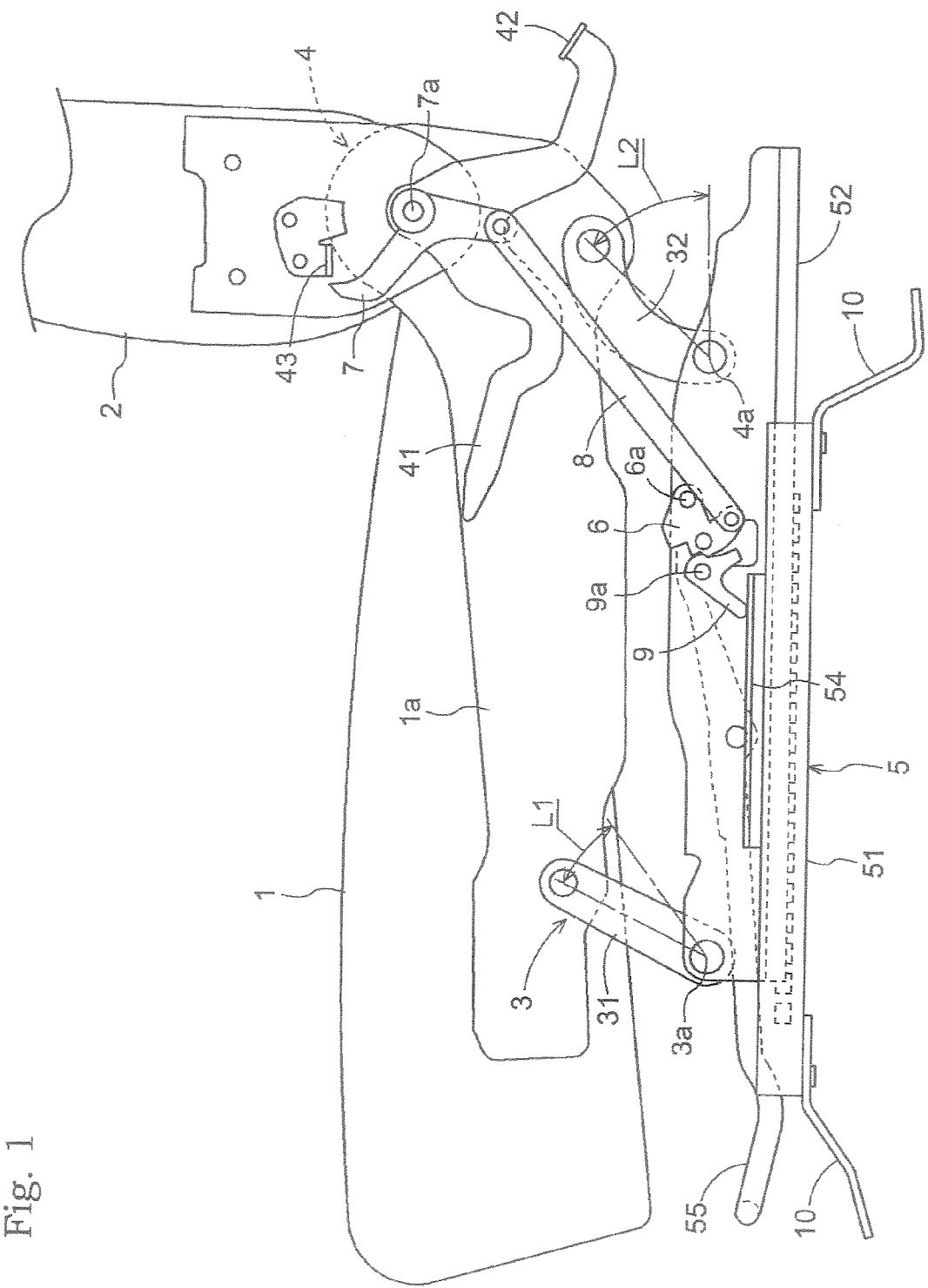
FIG. 1 is a side view of the walk-in device for a vehicle seat according to the first embodiment of the present invention in a state in which the device is adjusted to the highest end position by the lifting mechanism.
Figure 2:
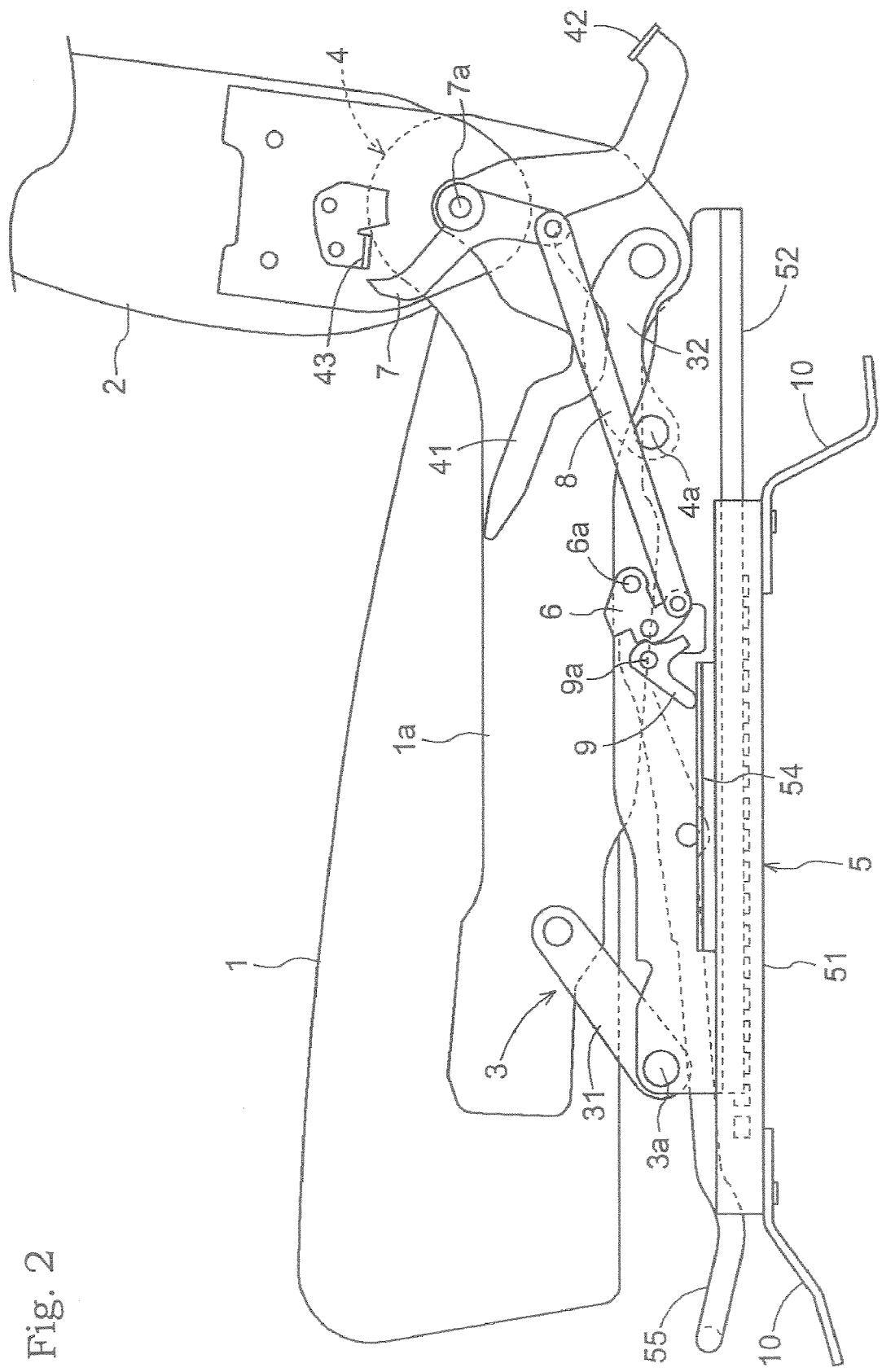
FIG. 2 is a side view of the walk-in device for a vehicle seat in FIG. 1 in a state in which the device is adjusted to the lowest end position by the lifting mechanism.
Figure 3:
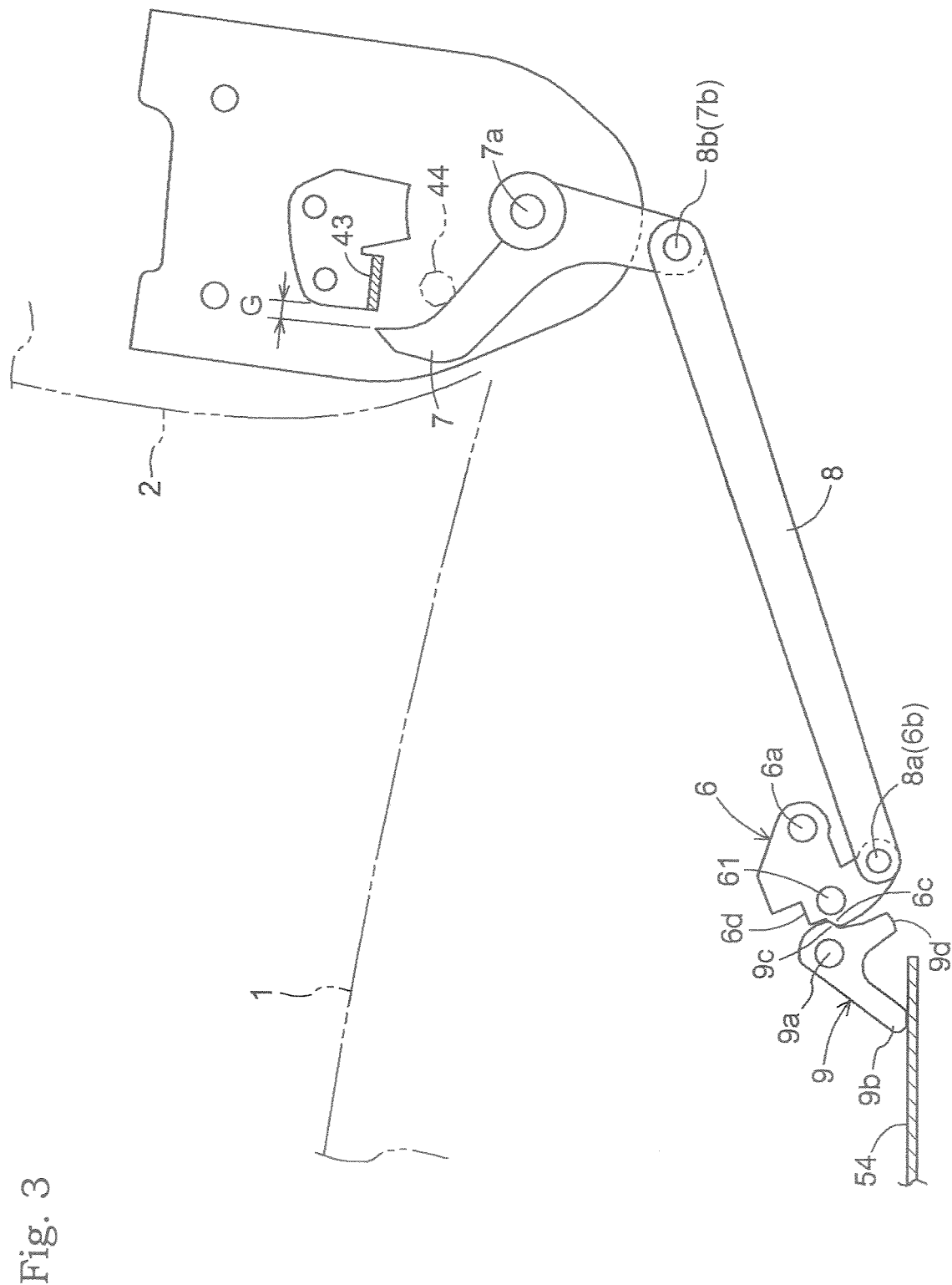
FIG. 3 is a diagram describing the operation of the walk-in device according to the first embodiment.
Figure 4:
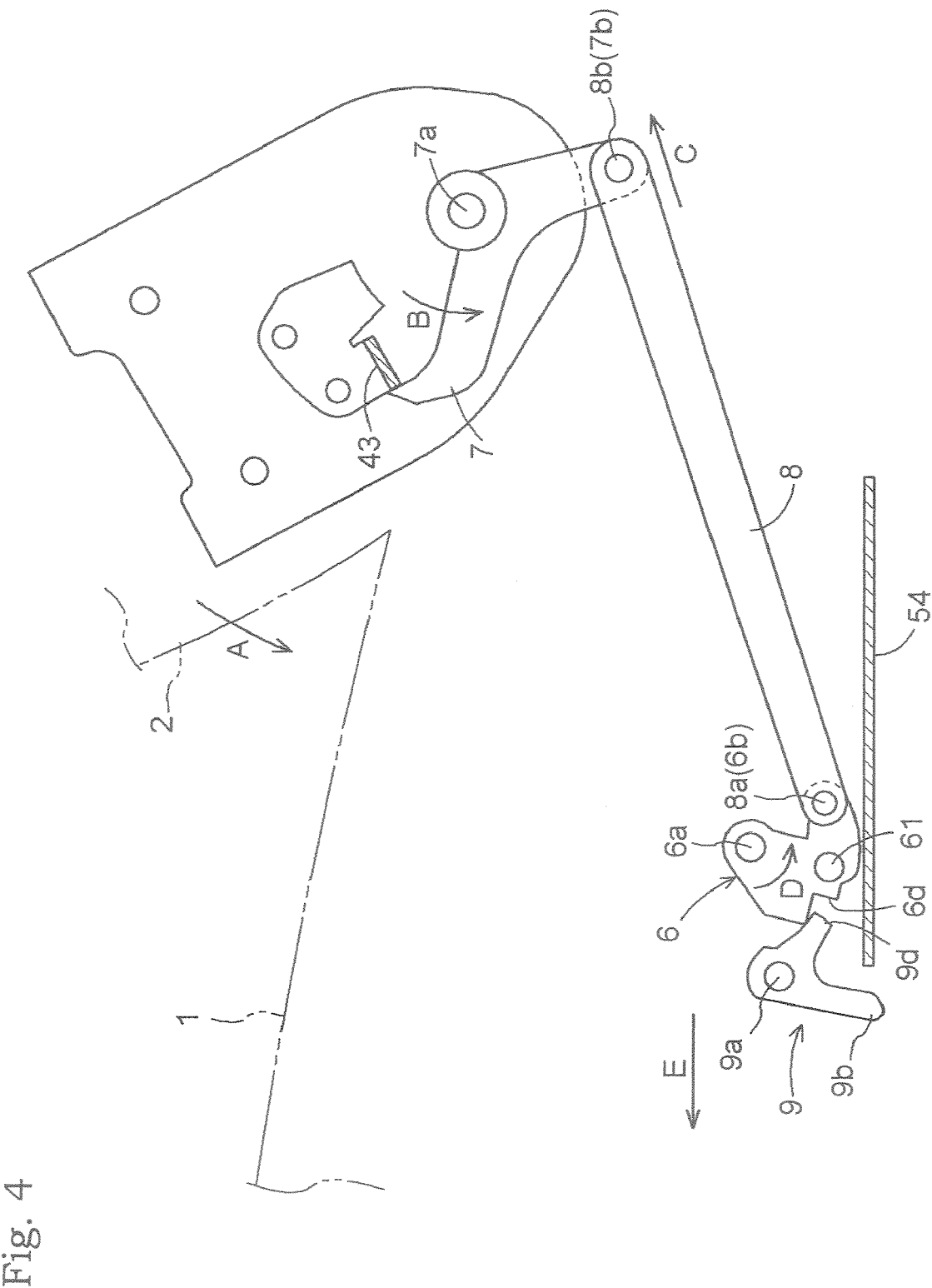
FIG. 4 is a diagram describing the operation of the walk-in device according to the first embodiment.
Figure 5:
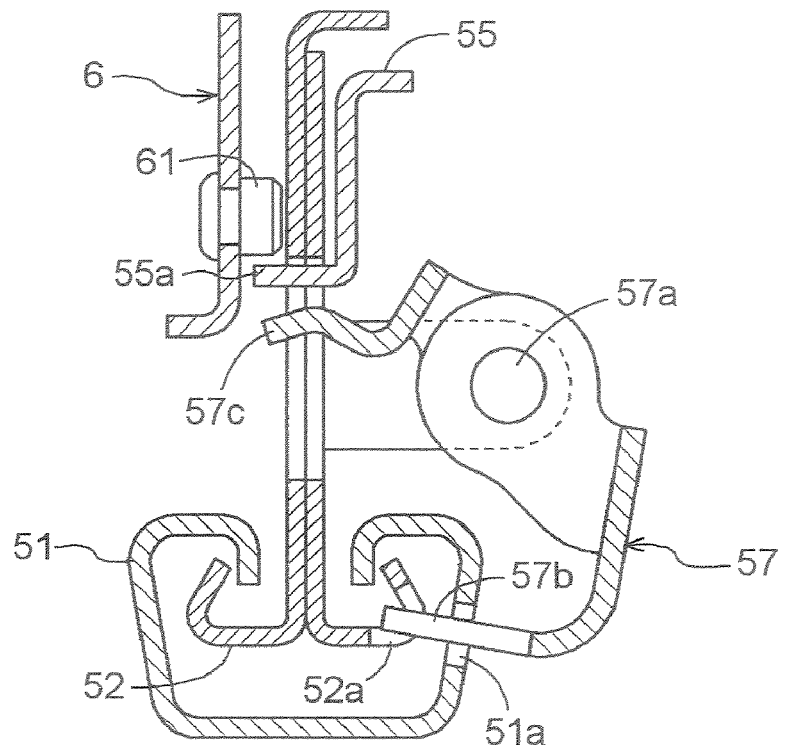
FIG. 5 is a diagram describing the operation of the fixing mechanism of the vehicle seat.
Figure 5:
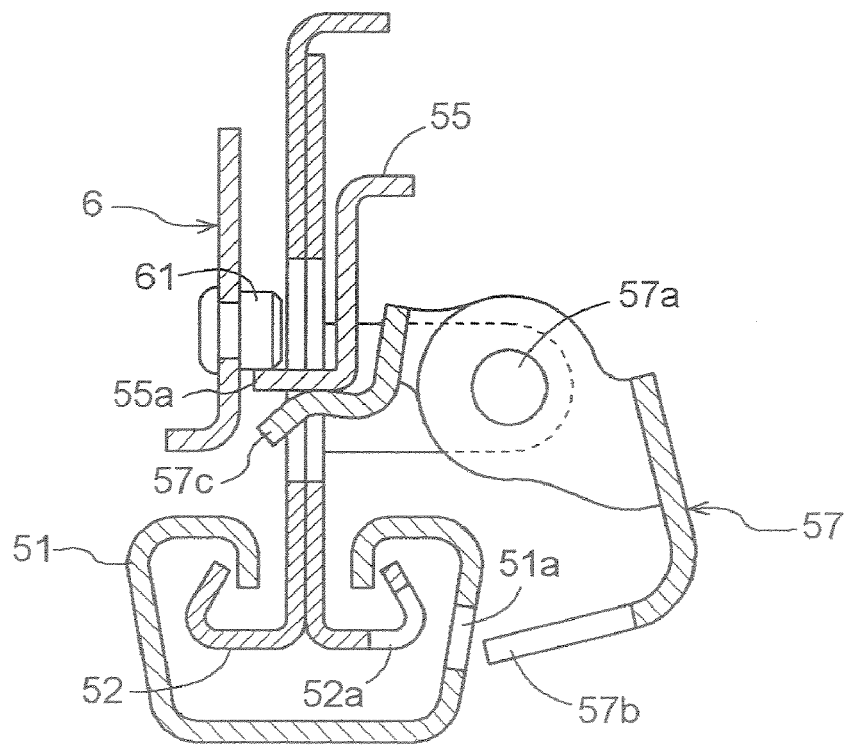
Figure 6:
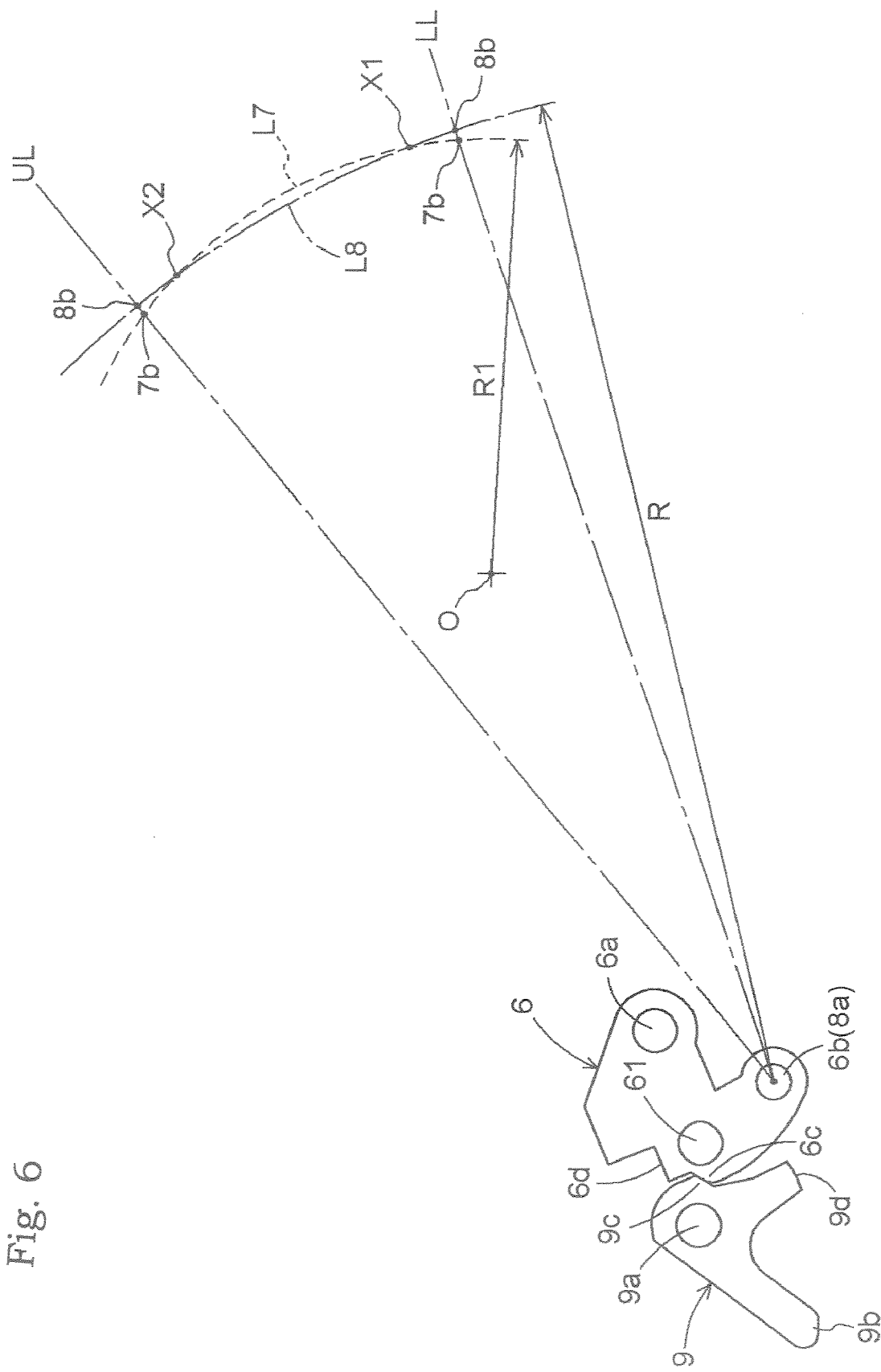
FIG. 6 is a diagram showing the trajectories of the fastening points of the seatback coupling link and of the joining link.
Figure 7:
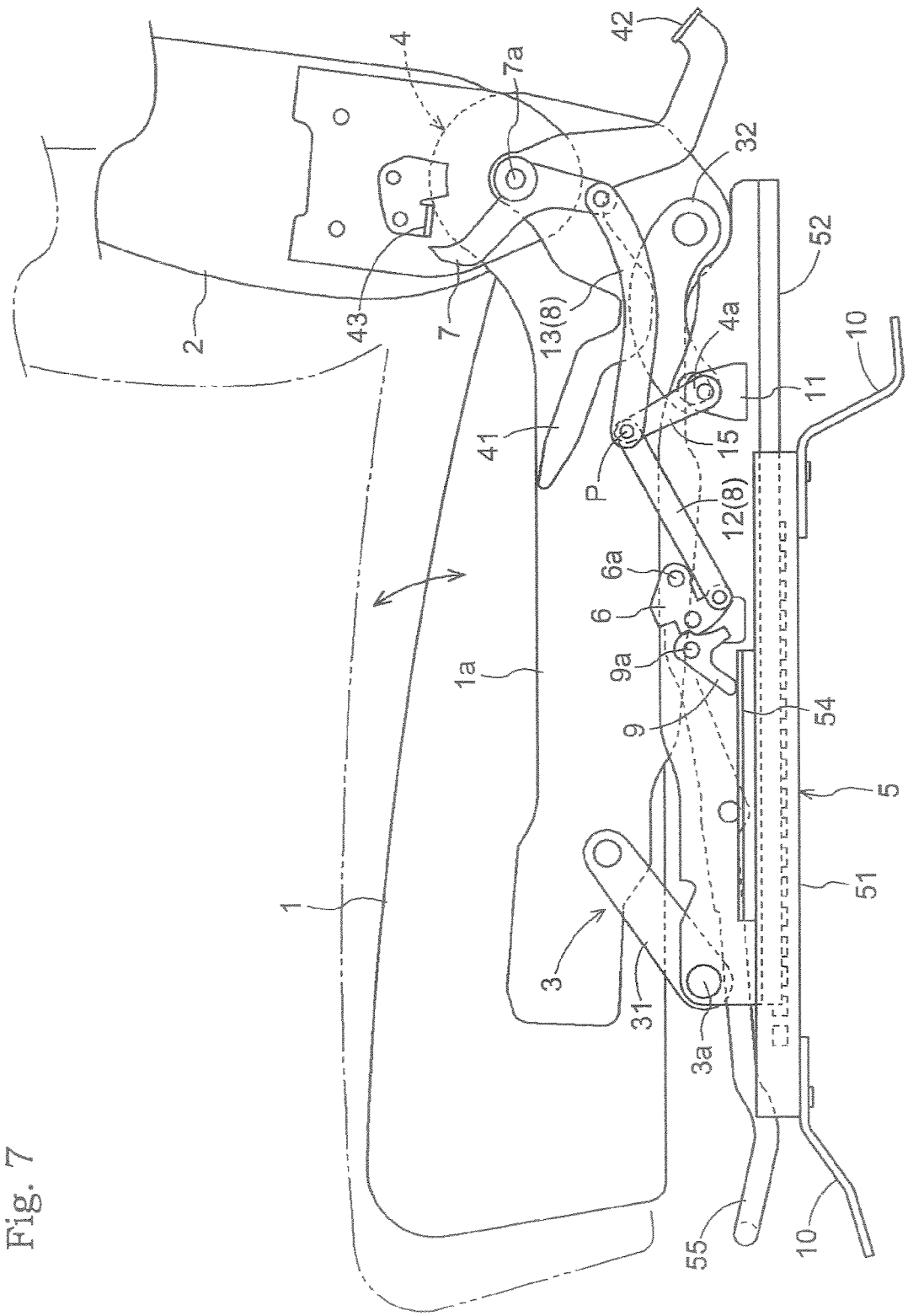
FIG. 7 is a side view of the walk-in device for a vehicle seat according to the second embodiment in a state in which the device is adjusted to the lowest end position by the lifting mechanism.
Figure 8:
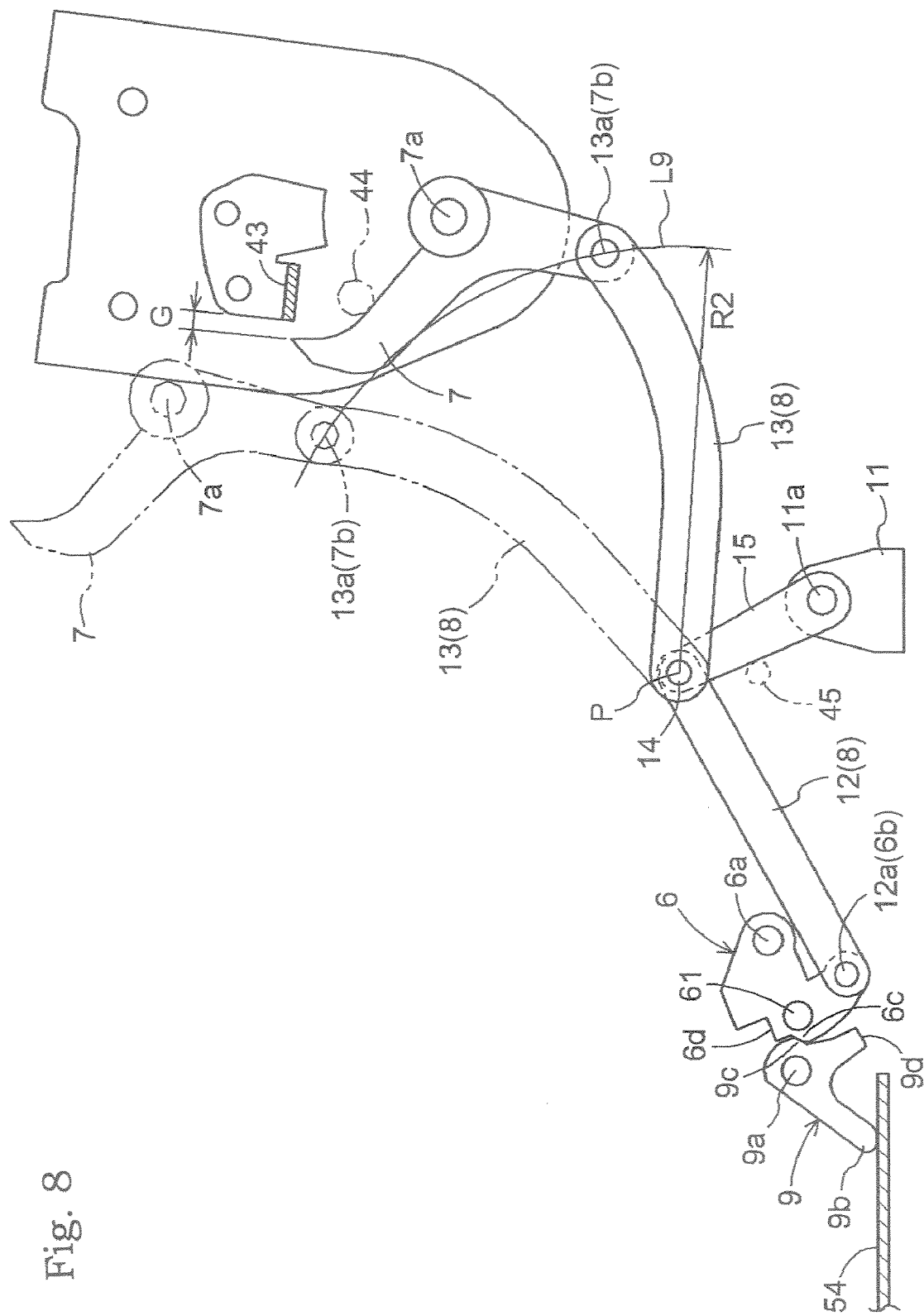
FIG. 8 is a diagram describing the operation of the walk-in device according to the second embodiment.
Figure 9:
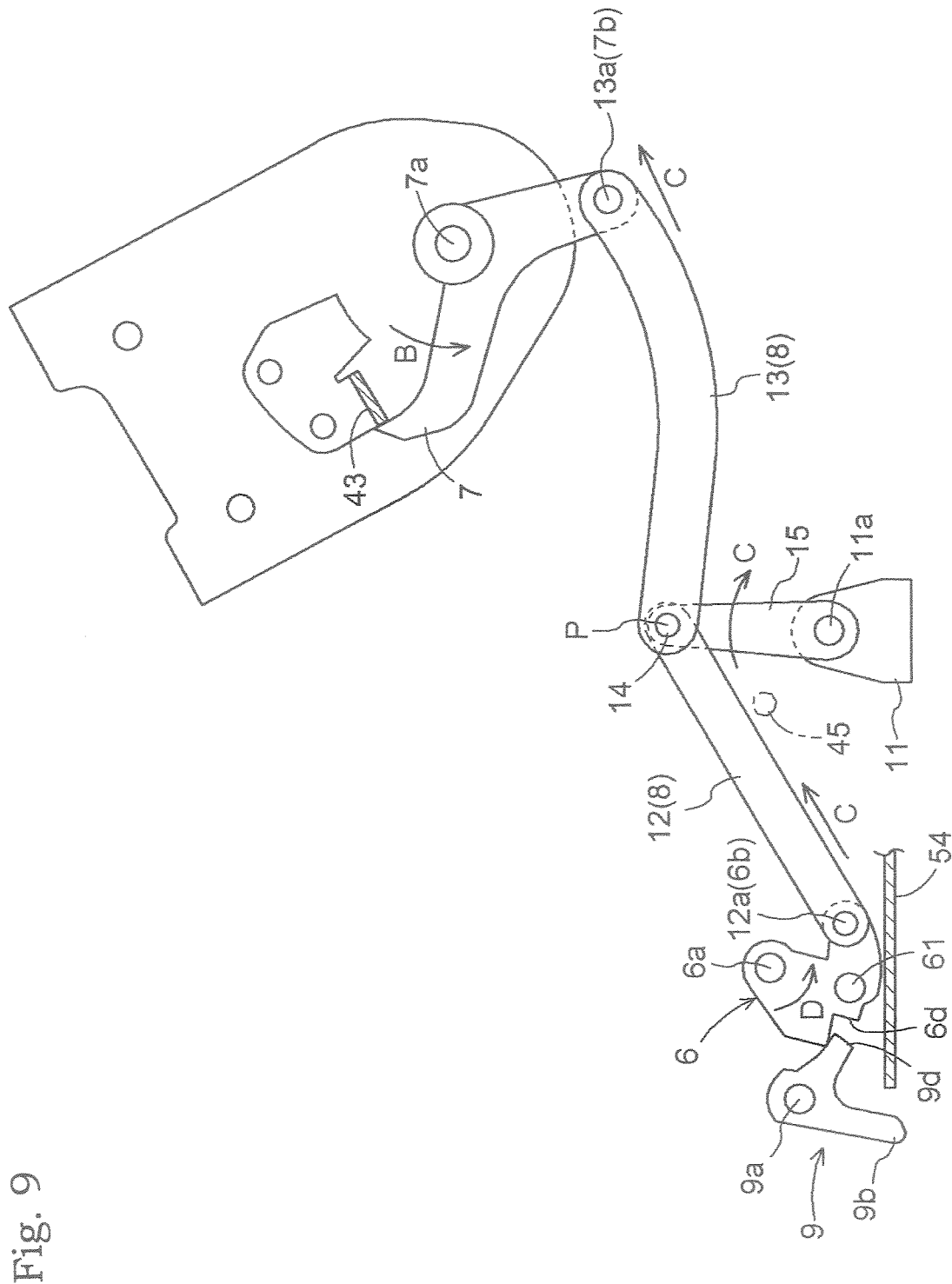
FIG. 9 is a diagram describing the operation of the walk-in device according to the second embodiment.
Figure 10:
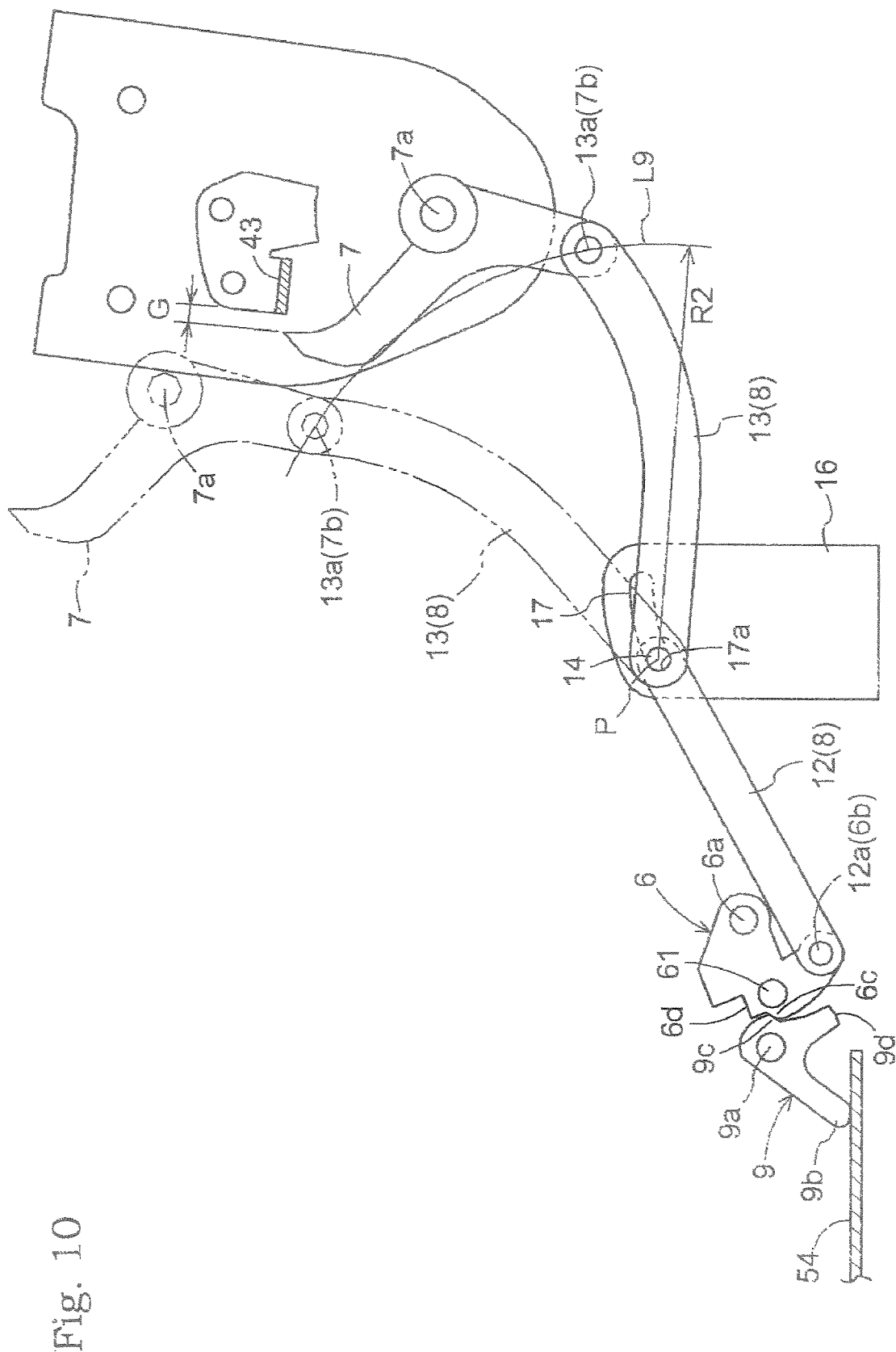
FIG. 10 is a diagram describing the operation of the walk-in device according to the third embodiment.
Figure 11:
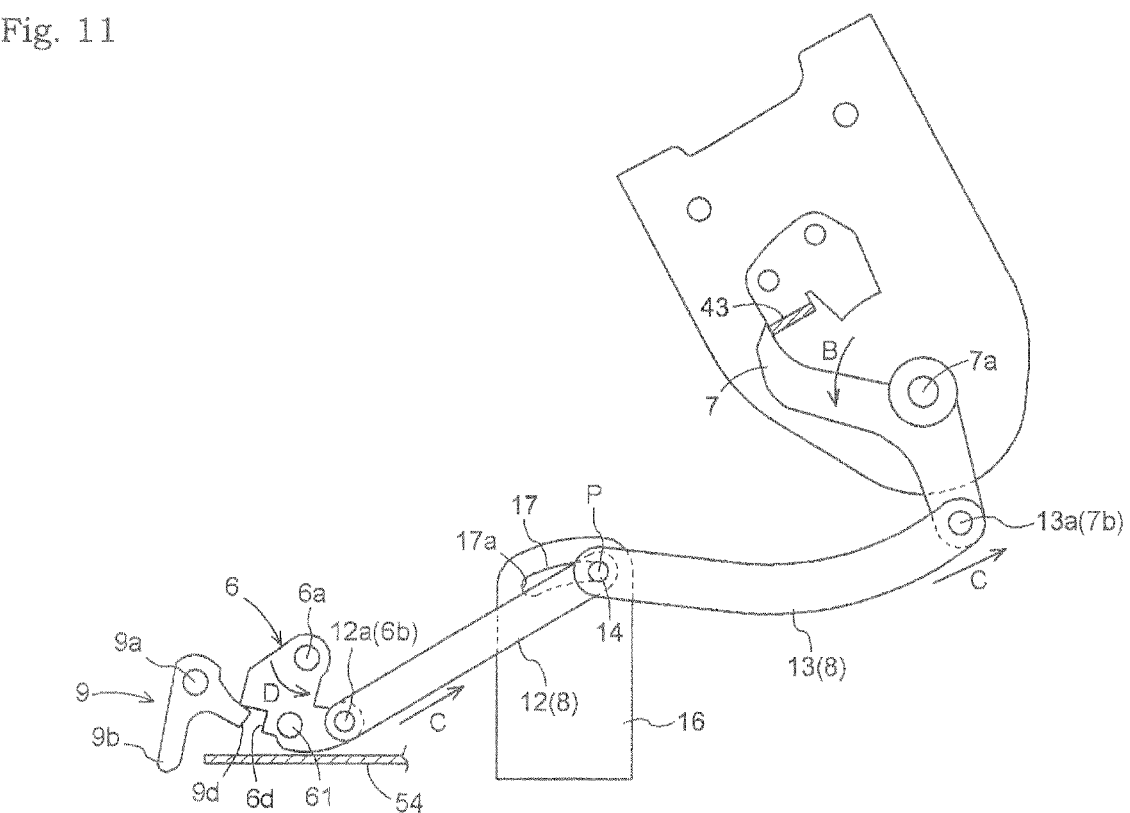
FIG. 11 is a diagram describing the operation of the walk-in device according to the third embodiment.

| 1 | seat cushion |
|---|---|
| 2 | seatback |
| 3 | lifting mechanism |
| 4 | reclining mechanism |
| 5 | seat sliding mechanism |
| 6 | slide lock releasing link |
| 7 | seatback coupling link |
| 7b | fastening point (third fastening point) of seatback coupling link |
| 8 | joining link |
| 8a | first fastening point |
| 8b | second fastening point |
| 12 | first link body |
| 13 | second link body |
| 14 | link connecting part |
| 15 | oscillating arm |
| 17 | groove |
| P | link fastening point |

The invention claimed is:

1. A walk-in device for a vehicle seat, comprising:
a lifting mechanism for adjusting the height of a surface of a vehicle seat cushion;
a reclining mechanism for adjusting the angle of inclination of a seatback of the vehicle seat, which moves up and down together with the seat cushion; and
a seat sliding mechanism that remains at the same height regardless of the vertical position of the seat cushion and that is used to adjust the longitudinal position of the vehicle seat; wherein
the vehicle seat is moved forward by the seat sliding mechanism in conjunction with a forward-folding operation for folding the seatback of the vehicle seat forward; and wherein
a joining link connects a seatback coupling link, which is provided to the seatback and which operates according to the forward-folding operation, and the joining link further connects a slide lock releasing link, which is provided to the seat sliding mechanism and which releases the vehicle seat from being fixed in the longitudinal direction.

2. The walk-in device for a vehicle seat according to claim 1, wherein the joining link is rotatably fastened to the slide lock releasing link at a first fastening point at one end, and a second fastening point at the other end is rotatably fastened to a third fastening point of the seatback coupling link, whereby the slide lock releasing link and the seatback coupling link are connected to the joining link; and
in cases in which the second fastening point and the third fastening point are not mutually constrained,
the trajectory of the second fastening point of the joining link that rotates about the first fastening point as a fulcrum in association with the up and down movement of the vehicle seat by the lifting mechanism, and
the trajectory of the third fastening point of the seatback coupling link that moves together with the reclining mechanism in association with the up and down movement of the vehicle seat by the lifting mechanism,
coincide in at least two points between the lowest part and the highest part of the vehicle seat that is moved up and down by the lifting mechanism.

3. The walk-in device for a vehicle seat according to claim 1, wherein displacement of at least one link selected from the seatback coupling link and the slide lock releasing link is restrained so that a specific gap, which is provided in an adjustable range of the seatback in a normal seated position so that the reclining mechanism and the seatback coupling link do not make contact, is maintained irrespective of movement of the joining link brought about by changes in the height of the surface of the seat cushion.

4. The walk-in device for a vehicle seat according to claim 2, wherein displacement of at least one link selected from the seatback coupling link and the slide lock releasing link is restrained so that a specific gap, which is provided in an adjustable range of the seatback in a normal seated position so that the reclining mechanism and the seatback coupling link do not make contact, is maintained irrespective of movement of the joining link brought about by changes in the height of the surface of the seat cushion.

5. The walk-in device for a vehicle seat according to claim 1, wherein the joining link is made of a single rigid member.

6. The walk-in device for a vehicle seat according to claim 1, wherein the joining link is configured from a plurality of link bodies that are rotatably fastened to each other;
   a link body, of the plurality of link bodies, located at an end portion on a side of the seatback coupling link is rotatably fastened to a fastening point of the seatback coupling link; and
   one of the link fastening points between link bodies is located in a central position or a substantially central position of a trajectory described by the seatback coupling link fastening point in association with the up and down movement of the vehicle seat by the lifting mechanism.

7. The walk-in device for a vehicle seat according to claim 6, wherein the joining link includes a first link body and a second link body; and
   wherein a link joining part between the first link body and the second link body is rotatably fastened to a distal end of an oscillating arm.

8. The walk-in device for a vehicle seat according to claim 6, wherein the joining link includes a first link body and a second link body; and
   wherein a link joining part between the first link body and the second link body is slidably provided in an oval-shaped groove.

9. The walk-in device for a vehicle seat according to claim 5, wherein displacement of at least one link selected from the seatback coupling link and the slide lock releasing link is restrained so that a specific gap, which is provided in an adjustable range of the seatback in a normal seated position so that the reclining mechanism and the seatback coupling link do not make contact, is maintained irrespective of movement of the joining link brought about by changes in the height of the surface of the seat cushion.

10. The walk-in device for a vehicle seat according to claim 6, wherein displacement of at least one link selected from the seatback coupling link and the slide lock releasing link is restrained so that a specific gap, which is provided in an adjustable range of the seatback in a normal seated position so that the reclining mechanism and the seatback coupling link do not make contact, is maintained irrespective of movement of the joining link brought about by changes in the height of the surface of the seat cushion.

11. The walk-in device for a vehicle seat according to claim 7, wherein displacement of at least one link selected from the seatback coupling link and the slide lock releasing link is restrained so that a specific gap, which is provided in an adjustable range of the seatback in a normal seated position so that the reclining mechanism and the seatback coupling link do not make contact, is maintained irrespective of movement of the joining link brought about by changes in the height of the surface of the seat cushion.

12. The walk-in device for a vehicle seat according to claim 8, wherein displacement of at least one link selected from the seatback coupling link and the slide lock releasing link is restrained so that a specific gap, which is provided in an adjustable range of the seatback in a normal seated position so that the reclining mechanism and the seatback coupling link do not make contact, is maintained irrespective of movement of the joining link brought about by changes in the height of the surface of the seat cushion.

\* \* \* \* \*